US007408105B2

(12) United States Patent
Murdock

(10) Patent No.: US 7,408,105 B2

(45) Date of Patent: Aug. 5, 2008

(54) INSTRUMENT TRAINING DEVICE FOR STRINGED INSTRUMENTS

(76) Inventor: Grayson M. Murdock, 2805 Piney Point Lane, Jacksonville, TX (US) 75766

( * ) Notice: Subject to any disclaimer, the term of this patent is extended or adjusted under 35 U.S.C. 154(b) by 173 days.

(21) Appl. No.: 11/341,287

(22) Filed: Jan. 27, 2006

(65) Prior Publication Data

US 2007/0175310 A1 Aug. 2, 2007

(51) Int. Cl.
*G09B 15/02* (2006.01)

(52) U.S. Cl. ................. 84/477 R; 84/470 R; 84/485 R; 84/453; 84/314 R

(58) Field of Classification Search ............... 84/470 R, 84/477 R, 485 R, 453

See application file for complete search history.

(56) References Cited

U.S. PATENT DOCUMENTS

| | | | | |
|---|---|---|---|---|
| 3,218,904 | A * | 11/1965 | Hartman | 84/485 R |
| 3,403,590 | A | 10/1968 | Quinton | |
| 3,820,434 | A | 6/1974 | Roberts | |
| 3,845,686 | A * | 11/1974 | Salvo | 84/485 R |
| 3,978,756 | A | 9/1976 | Feldman | |
| 4,291,606 | A * | 9/1981 | Lepage | 84/291 |
| 4,559,861 | A * | 12/1985 | Patty et al. | 84/470 R |
| 4,622,880 | A * | 11/1986 | Glemming et al. | 84/317 |
| 4,712,464 | A * | 12/1987 | Nance | 84/485 R |
| 4,753,147 | A * | 6/1988 | Berardi | 84/453 |
| 4,791,848 | A * | 12/1988 | Blum, Jr. | 84/453 |
| 4,807,509 | A * | 2/1989 | Graham | 84/314 R |
| 5,458,040 | A * | 10/1995 | Lawrence, Jr. | 84/473 |
| 5,540,133 | A * | 7/1996 | Draper et al. | 84/471 R |
| 5,920,023 | A * | 7/1999 | Ravagni et al. | 84/485 R |
| 5,977,462 | A * | 11/1999 | Wolfson | 84/267 |
| 6,218,603 | B1 * | 4/2001 | Coonce | 84/485 R |
| 6,288,315 | B1 * | 9/2001 | Bennett | 84/470 R |
| 6,452,080 | B1 | 9/2002 | Coonce | |
| 6,452,081 | B1 * | 9/2002 | Ravagni et al. | 84/477 R |
| 6,660,921 | B2 | 12/2003 | Deverich | |
| 6,753,466 | B1 * | 6/2004 | Lee | 84/669 |
| 6,984,780 | B2 * | 1/2006 | Reierson | 84/314 R |

(Continued)

OTHER PUBLICATIONS

Mary Bellis, “The Invention of Velcro,” http://inventors.about.com/library/weekly/aa091297.htm, viewed Oct. 9, 2007.*

(Continued)

*Primary Examiner*—Lincoln Donovan
*Assistant Examiner*—Robert W Horn
(74) *Attorney, Agent, or Firm*—Dale J. Ream

(57) ABSTRACT

An instrument training device for use with a stringed instrument includes a plurality of training members. Each training member is constructed of a flexible material and includes opposed ends. Each end includes complementary fastening material such as hook and loop fasteners for securing a respective training member about a fret board of a stringed instrument by releasably fastening the opposed ends together. Each training member includes indicia on a front portion thereof corresponding to chord sets or tuning schemes. The front portion is constructed of a resilient or elastic material that may be stretched across the front surface of the fret board such that the indicia thereon is situated directly beneath predetermined strings. This enables each training member to be used on stringed instruments of different sizes or widths. Each training member includes an identifier for positioning the training member at a predetermined position along a fret board.

16 Claims, 4 Drawing Sheets

U.S. PATENT DOCUMENTS

| | | | | |
|---|---|---|---|---|
| 7,084,340 | B2 * | 8/2006 | Tan | 84/477 R |
| 7,148,414 | B2 * | 12/2006 | Kestenbaum et al. | 84/483.2 |
| 2002/0011142 | A1 | 1/2002 | Mead | |
| 2005/0145095 | A1 * | 7/2005 | Larry | 84/453 |
| 2005/0257664 | A1 * | 11/2005 | Kessler | 84/453 |
| 2006/0048628 | A1 * | 3/2006 | Huwaldt | 84/314 R |
| 2006/0266197 | A1 * | 11/2006 | Stewart | 84/329 |
| 2007/0051226 | A1 * | 3/2007 | Diaz | 84/477 R |
| 2007/0175310 | A1 * | 8/2007 | Murdock | 84/314 R |

OTHER PUBLICATIONS

Frets (B. Hefner Company, http://edenhaus.com/frets.htm), viewed Oct. 9, 2007.*

* cited by examiner

INSTRUMENT TRAINING DEVICE FOR STRINGED INSTRUMENTS

BACKGROUND OF THE INVENTION

The present invention relates generally to instrument training devices and, more particularly, to a training device having training members that elastically extend across the fret board of the instrument and identify correct finger placement. The training device, therefore, is useful for training proper finger placement on a variety of types and sizes of stringed instruments.

Leaning to play a stringed instrument such as the guitar can be a difficult and sometimes frustrating undertaking for both the teacher and student. Students often look for shortcuts or other training aids to speed up this difficult process. Although various devices have been proposed in the art for assisting in the training of a guitar student, the existing proposals may not be easily used on instruments of various sizes, may damage an instrument's surface upon attachment, or are otherwise not easily attachable or readable.

Therefore, it is desirable to have an instrument training device for stringed instruments that may be quickly and easily attachable about the instruments fret board without damaging an instrument surface. Further, it is desirable to have an instrument training device having training members that may be stretched across freeboards of various widths and that still show correct finger placement. Still further, it is desirable to have an instrument training device having training members with multiple types of indicia for instant clarity and instruction.

SUMMARY OF THE INVENTION

A training device for stringed instruments according to the present invention includes a plurality of training members each capable of attachment to the fretted neck of a stringed instrument such as a guitar. Each training member includes a face portion bounded by opposed ends. The opposed ends include complementary securing elements such as hook and loop fasteners, adhesive, or other fastening elements such that they may be secured to one another for securely and selectively attaching the training member to the fretted neck of the stringed instrument. Each training member includes an identifier corresponding to a corresponding position on the fret board of the instrument.

The face portion of a training member is constructed of a material having elastic or resilient properties, such that it may be stretched across an front surface of the fretted neck and then be secured in that configuration when the opposed ends of the training member are secured together. Indicia indicative of musical notations are imprinted upon respective front portions so as to inform a user where to properly place his fingers, said note name indicia corresponding to chord groups or other tuning schemes. The indicia may be formed of injected colored die, surface printing, stickers, or the like.

The face portion and at least one of the opposed ends of each training member include dimensions suitable for passing between the fret board and the instrument's strings. Along with the stretchable characteristics of each face portion, the dimensions of each training member enables respective training members to be easily installed and removed from the neck of the instrument, as desired.

Therefore, a general object of this invention is to provide an instrument training device for training students to play a stringed instrument.

Another object of this invention is to provide an instrument training device, as aforesaid, in which each one of a plurality of training members may be securely attached around the fret board of a stringed instrument, yet quickly and easily removed therefrom.

Still another object of this invention is to provide an instrument training device, as aforesaid, in which each training member includes elastic properties enabling it to be stretched to conform to the individual width of the stringed instrument.

Yet another object of this invention is to provide an instrument training device, as aforesaid, having color-coded indicia for identifying respective tuning schemes or chord sets.

A further object of this invention is to provide an instrument training device, as aforesaid, in which each face portion and at least one opposed end are dimensioned to slide easily between the fret board and strings of the stringed instrument.

A still further object of this invention is to provide an instrument training device, as aforesaid, in which each face portion of a training member may include alphanumeric or color indicia or both.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

Figure 1:
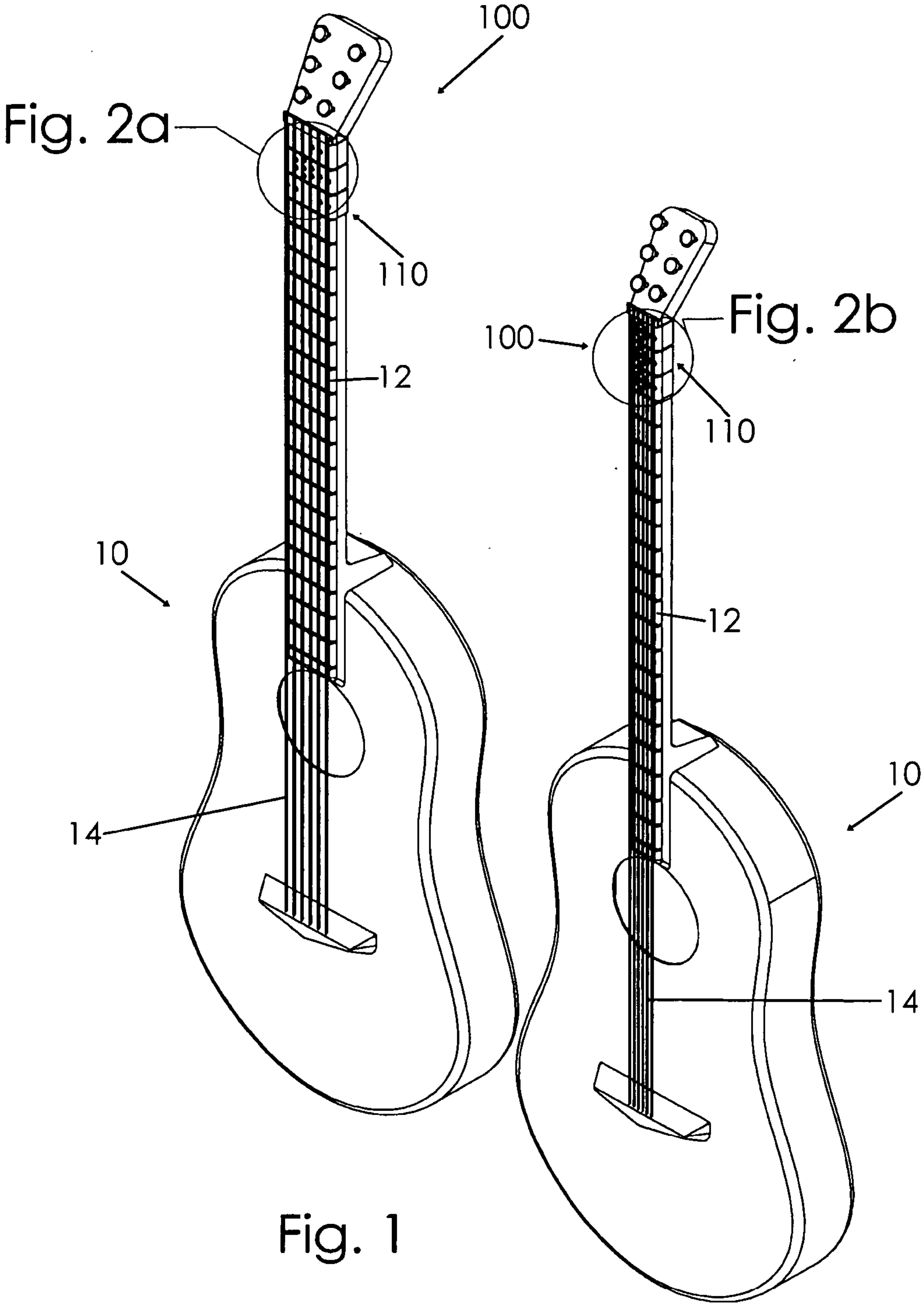
FIG. 1 is a perspective view of a plurality of training members of an instrument training device according to the present invention attached to respective freeboards of two stringed instruments of different sizes.

An instrument training device 100 according to the present invention will now be described in detail with reference to FIGS. 1 through 4*b* of the accompanying drawings. More particularly, an instrument training device 100 according to the current invention includes a plurality of training members 110 and is for use with various stringed instruments 10 having a fretboard 12 and one or more string 14. Each training member 110 includes first and second ends 112*a*, 112*b* and a face portion 120 between the first and second ends 112*a*, 112*b*.

Figure 3A:
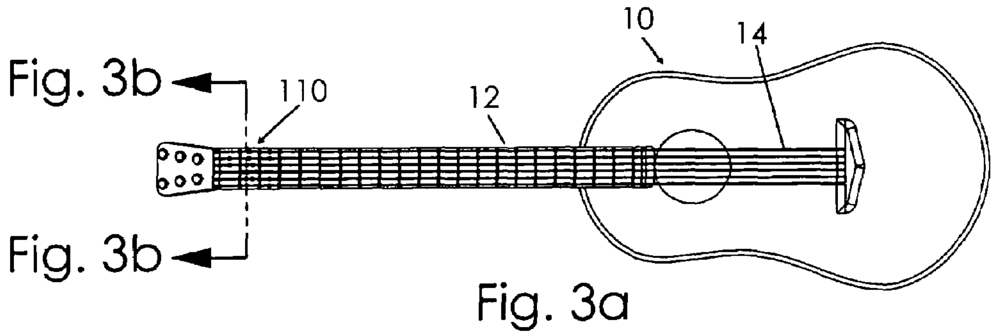
FIG. 3*a* is a planar front view of one of the stringed instruments as in FIG. 1.
Figure 3B:
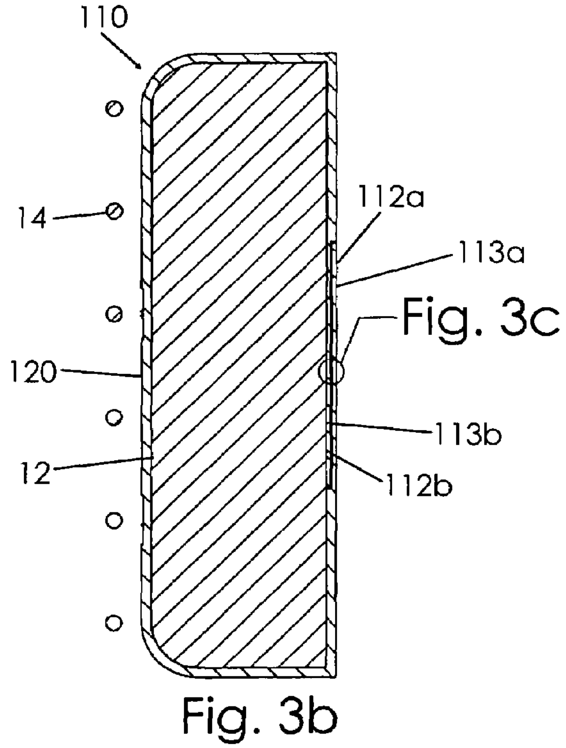
FIG. 3*b* is a sectional view taken along line 3*b*-3*b* as in FIG. 3*a;*
Figure 3C:
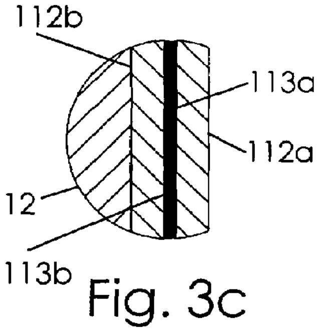
FIG. 3*c* is an isolated view on an enlarged scale of a portion of FIG. 3*b;*

As shown in FIGS. 3*b* and 3*c*, the first and second ends 112*a*, 112*b* may be selectively secured together. To selectively secure the first and second ends 112*a*, 112*b* together, the first and second ends 112*a*, 112*b* may have cooperable securing elements 113*a*, 113*b*. The cooperable securing elements 113a, 113b may include hook and loop fasteners, adhesive, or other fastening devices.

The face portion 120 has indicia 122 to convey predetermined information (FIGS. 2a and 2b), and the face portion 120 has elastic properties to allow the face portion 120 to be extended across various fretboards 12. To obtain the elastic properties, the face portion 120 may be constructed from rubber, latex, or another resilient material. The indicia 122 may be defined by color-coded dye injected into the face portion 120 so that the indicia 122 is wear-resistant, or the indicia 122 may be defined by other methods, such as traditional surface-printing methods or stickers, for example.

The indicia 122 may include letters, numbers, colors, and other symbols. Alphabetic data 122 may be representative of musical notation (FIGS. 2a and 2b), such as a note or a chord group, for example. Color 122 may be representative of a predetermined tuning scheme or a predetermined chord group, for example.

Figure 2A:
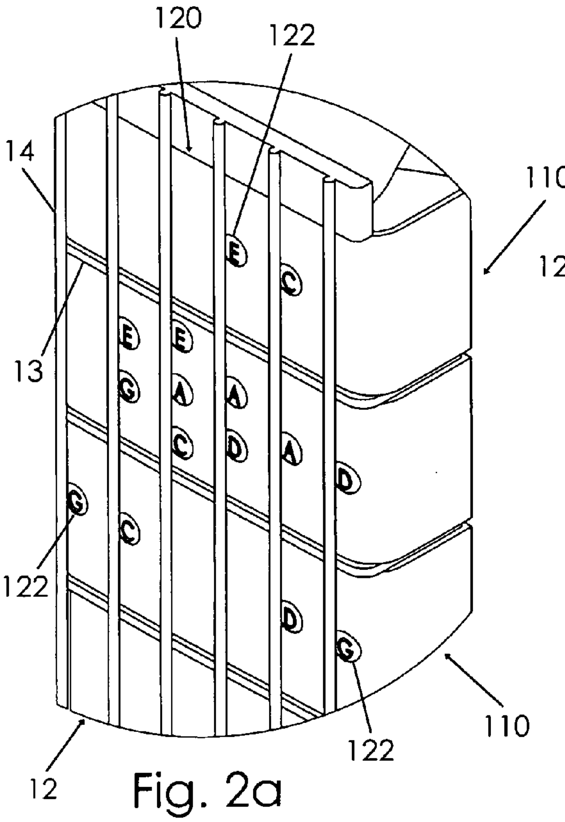
FIG. 2*a* is an isolated view on an enlarged scale of the training members attached to one stringed instrument as in FIG. 1.
Figure 2B:
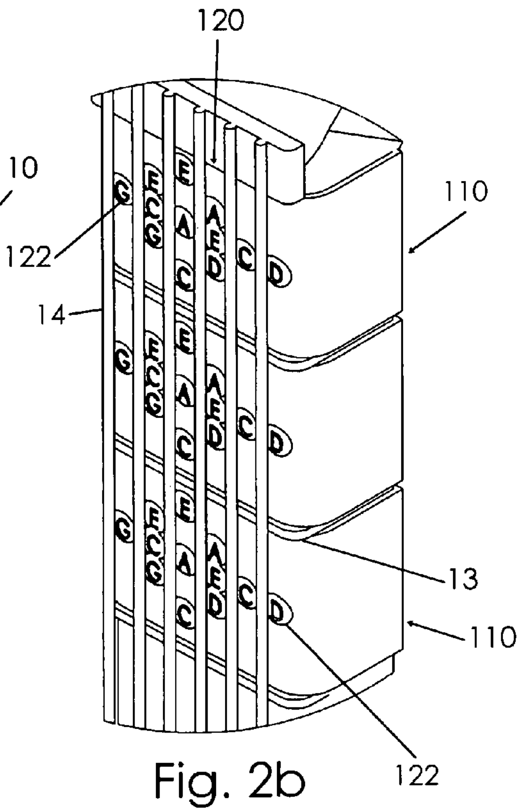
FIG. 2*b* is an isolated view on an enlarged scale of the training members attached to the other stringed instrument as in FIG. 1.

As shown in FIGS. 2a and 2b, at least one training member 110 preferably includes indicia 122 that is different from the indicia 122 of another training member 110. The training members 110 may also include identifiers so that the training members 110 may be positioned at predetermined locations along the fretboards 12. For example, the training member 110 intended to be placed at a first fret of the fretboard 12 may be marked as "1", the training member 110 intended to be placed at a second fret of the fretboard 12 may be marked as "2", etc.

The face portion 120 is preferably sized to fit between the fretboard 12 and the at least one string 14, and the face portion 120 may have a height that is less than a height of a fret 13 on the fretboard 12 (FIGS. 2a and 2b). One or both of the first and second ends 112a, 112b may be sized to pass between the fretboard 12 and the at least one string 14, as shown in FIG. 3b.

Figure 4A:
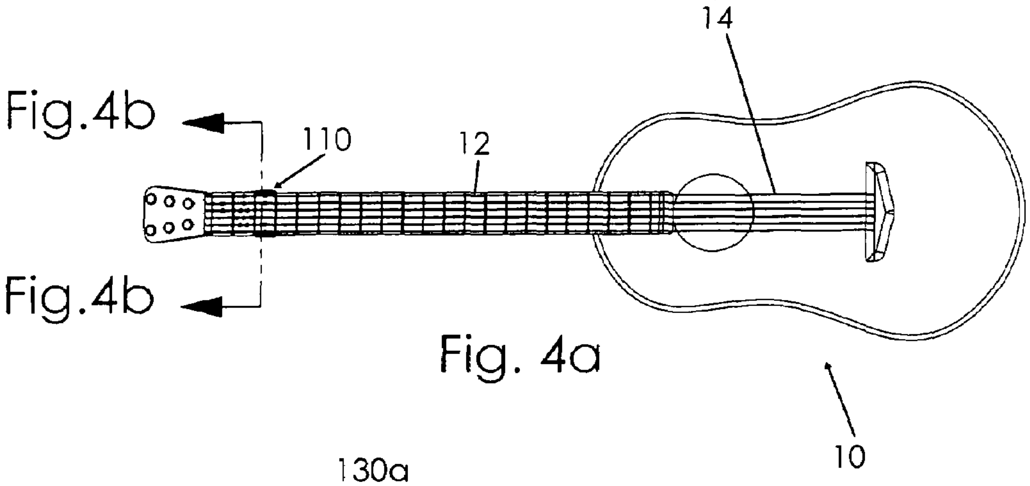
FIG. 4*a* is another planar front view of one of the stringed instruments as in FIG. 1.
Figure 4B:
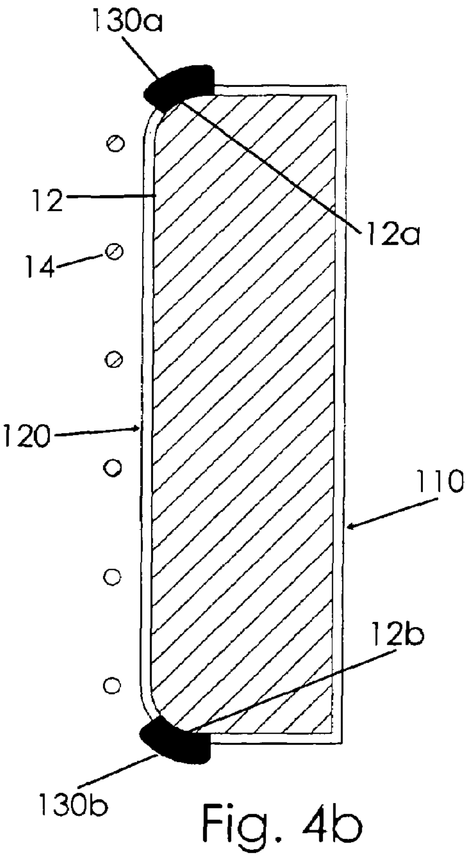
FIG. 4*b* is a sectional view taken along line 4*b*-4*b* of FIG. 4*a* showing use of positioning elements.

As shown in FIGS. 4a and 4b, the training member 110 may include first and second positioning elements 130a, 130b in communication with the face portion 120. The first and second positioning elements 130a, 130b are preferably configured to correspond to opposed sides 12a, 12b of respective fretboards 12 to maintain the face portion 120 at a predetermined position in respect to the respective fretboards 12. The first and second positioning elements 130a, 130b may be constructed of rigid plastic or of another material.

In use, a stringed instrument 10 (such as a guitar, a bass guitar, a banjo, a ukulele, a cello, etc.) is provided. Notably, the instrument 10 does not have to be of a uniform size. The individual training members 110 may then be located along the fretboard 12 according to identifiers as discussed above. To attach the training members 110 to the fretboard 12, the first or second end 112a, 112b may be slid between the fretboard 12 and the strings 14 and wrapped around the fretboard 12, causing the face portion 120 to be positioned between the fretboard 12 and the strings 14 (FIGS. 2a-3b). The first and second ends 112a, 112b may then be secured together as discussed above and shown in FIGS. 3b and 3c. It is very important that the face portion 120 is elastic, since this elasticity allows the face portion 120 to tightly conform to a variety of different-sized fretboards 12. This is shown in FIG. 1 and by comparing FIGS. 2a and 2b. If the first and second positioning elements 130a, 130b are included, the first and second positioning elements 130a, 130b may be positioned at the opposed sides 12a, 12b of the fretboard 12 (FIG. 4b). The positioning elements 130a, 130b then keep the face portion 120 at a predetermined position. This is important because the indicia 122 may be arranged to correspond to the strings 14 when the face portion 120 is at the predetermined position, and another position may render the indicia 122 insignificant.

A user may then practice different finger positions by playing notes corresponding to (or indicated by) the indicia 122 as discussed above. If the indicia 122 indicates a chord, for example, the user may practice the chord by pressing the indicated strings 14 at the indicated positions on the fretboard 12. In another use, the user may learn the names of the notes on the fretboard 12 by studying the indicia 122.

It is understood that while certain forms of this invention have been illustrated and described, it is not limited thereto except insofar as such limitations are included in the following claims and allowable functional equivalents thereof.

What is claimed is as follows:

1. An instrument training device for use with a stringed instrument having a fretboard and at least one string, said training device comprising a plurality of training members, each said training member comprising:

first and second opposed ends which may be selectively secured together;

a face portion situated between said first and second ends, said face portion having indicia for conveying predetermined information, said face portion having elastic properties to allow said face portion to be extended across the fretboard;

wherein at least one said training member includes first and second positioning elements; and wherein said first and second positioning includes configurations that are complementary to corresponding opposed sides of the fretboard so as to maintain said face portion at a predetermined position in respect to the fretboard; and wherein each said training member includes an identifier so that said training members may be positioned at predetermined locations alone the fretboard.

2. The training device as in claim 1, wherein:

said first end includes at least one of a hook fastener and a loop fastener; and said second end includes at least another of said hook fastener and said loop fastener.

3. The training device as in claim 1, wherein said indicia includes at least one of letters, numbers, and colors.

4. The training device as in claim 1, wherein said indicia includes alphabetic data indicative of musical notation.

5. The training device as in claim 4, wherein said indicia includes color indicative of a predetermined tuning scheme.

6. The training device as in claim 4, wherein said indicia includes color representative of a predetermined chord group.

7. The training device as in claim 1, wherein said face portion is sized to fit between the fretboard and the at least one string.

8. The training device as in claim 7, wherein at least one of said first and second ends is sized to pass between the fretboard and the at least one string.

9. The training device as in claim 1, wherein said indicia is formed by color-coded dye injected into said face portion.

10. The training device as in claim 1, wherein at least one said training member includes indicia that is different from said indicia of another said training member.

11. The training device as in claim 1, wherein said face portion is constructed from at least one material selected from the group consisting of rubber and latex.

12. The training device as in claim 1, wherein said face portion has a height that is less than a height of a fret on the fretboard.

13. A training member for use with any of a plurality of stringed instruments having a fretboard and at least one string, said training member comprising:

first and second opposed ends, said first and second ends having cooperable securing elements;

a face portion between said first and second ends, said face portion having indicia to convey predetermined information, said face portion having elastic properties to allow said face portion to be extended across each respective fretboard;

a said indicia includes alphabetic data representative of musical notation;

said indicia color representative of a predetermined tuning scheme or a predetermined chord group;

said cooperable securing elements include hook and loop fasteners;

said face portion is size to fit between the fretboard and the at least one to string; and first and second positioning elements are in communication with said face portion and configured to correspond to opposed sides of each respective fretboard to maintain said face portion at a predetermined position in respect to each respective fretboard.

14. The training member as in claim 13, wherein:

said indicia includes alphabetic data representative of musical notation; and said indicia includes color representative of a predetermined tuning scheme or a predetermined chord group.

15. The training member as in claim 13, wherein:

said face portion is sized to fit between the fretboard and the at least one string; and at least one of said first and second ends is sized to pass between the fretboard and the at least one string.

16. The training member as in claim 13, wherein:

said cooperable securing elements include hook and loop fasteners; and said indicia is defined by color-coded dye injected into said face portion.

* * * * *